United States Patent [19]
König et al.

[11] Patent Number: 5,350,825
[45] Date of Patent: Sep. 27, 1994

[54] AT LEAST PARTIALLY BLOCKED ORGANIC POLYISOCYANATES, A PROCESS FOR THEIR PREPARATION AND THEIR USE IN COATING COMPOSITIONS

[75] Inventors: Eberhard König, Cologne; Holger Casselmann, Bergisch Gladbach; Frank Kobelka, Leverkusen; Keith-Allen Foster, Krefeld, all of Fed. Rep. of Germany

[73] Assignees: Bayer Aktiengesellschaft, Leverkusen, Fed. Rep. of Germany; Miles Inc., Pittsburgh, Pa.

[21] Appl. No.: 157,350

[22] Filed: Nov. 23, 1993

[30] Foreign Application Priority Data

Dec. 2, 1992 [DE] Fed. Rep. of Germany ....... 4240480

[51] Int. Cl.$^5$ ............................................. C08G 18/80
[52] U.S. Cl. .................................. 528/45; 252/182.2; 252/182.21; 252/182.22
[58] Field of Search .......... 528/45; 252/182.2, 182.21, 252/182.22

[56] References Cited

U.S. PATENT DOCUMENTS

| | | | |
|---|---|---|---|
| 4,007,215 | 2/1977 | Hartmann et al. | 260/468 J |
| 4,482,721 | 11/1984 | Wegner et al. | 548/262 |
| 4,495,229 | 1/1985 | Wolf et al. | 427/388.2 |
| 4,576,979 | 3/1987 | Schupp et al. | 523/404 |
| 4,608,416 | 8/1986 | Schupp et al. | 525/130 |

FOREIGN PATENT DOCUMENTS

| | | |
|---|---|---|
| 249884 | 12/1987 | European Pat. Off. . |
| 403044 | 12/1990 | European Pat. Off. . |
| 3001060 | 7/1981 | Fed. Rep. of Germany . |

*Primary Examiner*—Maurice J. Welsh
*Attorney, Agent, or Firm*—Joseph C. Gil; Thomas W. Roy; Richard E. L. Henderson

[57] ABSTRACT

The present invention relates to organic polyisocyanates which have a content of unblocked and blocked isocyanate groups (calculated as NCO) of 5 to 20 wt.%, preferably 7 to 15 wt.%, wherein at least 95%, preferably 100%, of the isocyanate groups are present in blocked form and wherein the blocking agent contains A) 30 to 70 equivalent-% of diisopropylamine,
B) 30 to 70 equivalent-% of at least one other blocking agent selected from CH-acidic esters and 1,2,4-triazole and
C) 0 to 20 equivalent-% of blocking agents other than those set forth in A) and B), wherein the percentages of A), B) and C) add up to 100.

The present invention also relates to a process for the production of these organic polyisocyanates and their use as crosslinking agents for organic polyhydroxyl compounds in polyurethane coating compositions.

11 Claims, No Drawings

AT LEAST PARTIALLY BLOCKED ORGANIC POLYISOCYANATES, A PROCESS FOR THEIR PREPARATION AND THEIR USE IN COATING COMPOSITIONS

BACKGROUND OF THE INVENTION

1. Field of the Invention

The present invention relates to novel organic polyisocyanates having predominantly or entirely blocked isocyanate groups, in which at least two different blocking agents are present, to a process for their production and to their use as crosslinking agents in heat curable, polyurethane coating compositions.

2. Description of the Prior Art

Blocking organic polyisocyanates with blocking agents and the use of the blocked polyisocyanates as a crosslinking resin for polyurethane baking lacquers are known. Thus, for example, S. Petersen in Liebigs Ann. Chem. 562 (1949), p. 205 et seq mentions the possibility of blocking 1,6-diisocyanatohexane with blocking agents such as malonic acid diethyl ester, acetoacetic acid diethyl ester or piperidine. However, the resultant reaction products display a marked tendency to crystallize and for this reason alone are unusable as crosslinking resins for baking lacquers dissolved in lacquer solvents.

DE-OS 2,436,872 describes liquid, blocked polyisocyanates, which are prepared from isophorone diisocyanate and malonic acid esters. Analogous liquid polyisocyanates are also described in DE-OS 3,001,060. These are malonic or acetoacetic ester blocked trimers of isophorone diisocyanate with isocyanurate groups. The use of such polyisocyanates which are entirely blocked with CH-acid esters as crosslinking resins for polyhydroxyl compounds results, after crosslinking, in an amide-ester compound instead of urethane groups as is known from Wicks, Kostyk J. Coat. Techn. 49, 1977, p. 77. This is also apparent from slightly poorer properties of the resulting coatings and, in particular, in reduced storage stability of the coating compositions (c.f. examples 10 and 11).

EP-A-0,096,210 describes one-component binders wherein the isocyanate component is blocked entirely with secondary amines, for example diisopropylamine. Based on the disclosure, these blocked polyisocyanates are primarily useful as solid products for powder coating applications.

EP-A-0,125,438 also describes one-component binders wherein the isocyanate component is blocked with secondary amines. Since, as may be seen from the examples, the intermediately produced isocyanate components are formulated into the ready-to-use lacquers, it is not apparent to what extent these isocyanate components are stable in terms of crystallization.

DE-OS 2,812,252 describes polyisocyanate crosslinking agents blocked with 1,2,4-triazole. Again, the emphasis is on the production of powder coatings. Polyisocyanates blocked with 1,2,4-triazole generally have a marked tendency to crystallize.

EP-A-0,403,044 describes blocked polyisocyanates with at least two blocking agents wherein the unblocking temperatures are at least 40° C. apart. The intended objective is step-wise crosslinking. The disclosed blocking agents include ε-caprolactam, oximes and butanol, which crosslink at significantly above 150° C.

The industrially and economically important polyisocyanates having isocyanurate groups and prepared from 1,6-diisocyanatohexane have to date remained without commercial importance when blocked with blocking agents which are released at low temperatures such as malonic esters or diisopropylamine. This is because, when dissolved in lacquer solvents, such blocked polyisocyanates are not stable in storage (see also comparative examples 1 and 2).

An object of the present invention is to provide novel, blocked lacquer polyisocyanates which may be used for the production of baking lacquers which have a maximum baking temperature of 140° C. and which may be dissolved in known lacquer solvents to produce storage stable solutions.

This object may be achieved with the polyisocyanates according to the invention which are described in greater detail below.

SUMMARY OF THE INVENTION

The present invention relates to organic polyisocyanates which have a content of unblocked and blocked isocyanate groups (calculated as NCO) of 5 to 20 wt.%, preferably 7 to 15 wt.%, wherein at least 95%, preferably 100%, of the isocyanate groups are present in blocked form and wherein the blocking agent contains
A) 30 to 70 equivalent-% of diisopropylamine,
B) 30 to 70 equivalent-% of at least one other blocking agent selected from CH-acidic esters and 1,2,4-triazole and
C) 0 to 20 equivalent-% of blocking agents other than those set forth in A) and B),
wherein the percentages of A), B) and C) add up to 100.

The present invention also relates to a process for the production of these organic polyisocyanates by reacting at 20° to 120° C. at least 95 equivalent-% of the isocyanate groups of the polyisocyanates with a blocking agent mixture containing, based on the total equivalents of blocking agents,
A) 30 to 70 equivalent-% of diisopropylamine,
B) 30 to 70 equivalent-% of at least one other blocking agent selected from CH-acidic esters and 1,2,4-triazole and
C) 0 to 20 equivalent-% of blocking agents other than those set forth in A) and B).

The present invention finally relates to the use of the blocked polyisocyanates as crosslinking agents for organic polyhydroxyl compounds in polyurethane coating compositions.

DETAILED DESCRIPTION OF THE INVENTION.

The polyisocyanates from which the blocked polyisocyanates according to the invention are prepared are known from polyurethane chemistry and include polyisocyanates having aliphatically, cycloaliphatically and/or aromatically bound isocyanate groups and an isocyanate content of 30 to 50 wt.%. Examples include 1 diisocyanatohexane; 1-isocyanato-3,3,5-trimethyl-5-isocyanatomethylcyclohexane (isophorone diisocyanate or IPDI); 4,4'-diisocyanatodicyclohexylmethane; 2,4- and/or 2,6-diisocyanatotoluene; 4,4'-diisocyanatodiphenylmethane; mixtures thereof with up to 50 wt.%, preferably up to 40 wt.%, based on the weight of the mixture, of 2,4'°-diisocyanatodiphenylmethane and up to 5 wt.%, based on the weight of the mixture, of 2,2'-diisocyanatodiphenylmethane; and mixtures of the diisocyanatodiphenylmethane isomers with their higher homologs having more than two isocyanate groups, wherein these mixtures preferably contain at least 80 wt.% of the diisocyanatodiphenylmethane isomers. Mixtures of the preceding polyisocyanates and/or other polyisocyanates may also be used.

Also suitable as starting material for the process according to the invention are derivatives of the monomeric diisocyanates having biuret, isocyanurate and/or uretidione groups, in particular those with aliphatically and/or cycloaliphatically bound isocyanate groups, and especially the corresponding derivatives of 1,6-diisocyanatohexane.

Particularly preferred starting materials for preparing the polyisocyanates according to the invention are, (i) derivatives of 1,6-diisocyanatohexane containing isocyanurate groups and having an NCO content of 19 to 25 wt.%, (ii) mixtures of polyisocyanates (i) with 4,4'-diisocyanatodicyclohexylmethane in a weight ratio of 10:1 to 1:10, (iii) mixtures of polyisocyanates (i) with polyisocyanates containing isocyanurate groups, prepared from IPDI and having an NCO content of 17 to 20 wt.% in a weight ratio of 10:1 to 1:10 and (iv) commercial MDI mixtures containing 75 to 80 wt.% of 4,4'-diisocyanatodiphenylmethane, 8 to 12 wt.% of 2,4'-diisocyanatodiphenylmethane, 0 to 3 wt.% of 2,2'-diisocyanatodiphenylmethane, wherein the remainder may optionally contain higher homologs of these diisocyanates.

The starting polyisocyanates may also be in prepolymer form by reacting the preceding polyisocyanates with polyhydric alcohols having an OH number of from 56 to 1900. To prepare the prepolymers 0,05 to 0,6 equivalents of OH compounds are reacted per equivalent of NCO groups. Examples of such polyols are 1,4dihydroxybutane, 2-ethyl-1,3-hexanediol, tri- and tetrapropylene glycol, other polypropylene glycols or polypropylene glycol mixtures having the necessary OH number and the addition product of 2 moles of propylene carbonate onto 1 mole of hydrafine-Trifunctional polyols such as glycerol or trimethylol propane may also be used, optionally in admixture with the diols exemplified hereinbefore. Among the preferred prepolymers are those which are based on 2,4-diisocyanato toluene and a polyol mixture comprising (i) polypropylene glycol having an OH number of from 56 to 112, (ii) from 50 to 150 OH-equivalent-%, based on (i), of diethylene glycol and (iii) from 150 to 250 OH-equivalent-% based on (i), of trimethylol propane and which are prepared at an NCO/OH-equivalent ratio of from 1,6:1 to 2:1. Prepolymer formation of the starting polyisocyanates may proceed either simultaneously with the blocking reaction, for example, by reacting the starting polyisocyanates with a mixture of blocking agents and polyol, or sequentially by reacting the starting polyisocyanate with the blocking agents and the polyol in any desired order. The blocking agents to be used in the process according to the invention contain, based on the total equivalents of blocking agent, 30 to 70, preferably 40 to 60, equivalent-% of blocking agent A), 30 to 70, preferably 40 to 60 equivalent-%, of blocking agent B) and 0 to 20, preferably 0, equivalent-% of blocking agent C).

Diisopropylamine is used as blocking agent A). Suitable blocking agents B) include (i) CH-acidic esters, preferably malonic acid diethyl ester or acetoacetic acid ethyl ester, and more preferably malonic acid diethyl ester, (ii) 1,2,4-triazole and (iii) mixtures of these blocking agents.

Other suitable blocking agents which may be used in conjunction with blocking agents A) and B) are known and include butanone oxime and ε-caprolactam.

In accordance with the process according to the invention, the blocking agents are used in a quantity which corresponds to an equivalent ratio of blocking agent to isocyanate groups of the starting polyisocyanate, minus the isocyanate groups optionally required for in situ prepolymer formation with diols, of 0.95:1 to 1.2:1, preferably 1:1 to 1.1:1.

The process according to the invention is generally carried out at a temperature of 20° to 120° C., preferably 50° to 100° C., in the absence or the presence of solvents. Suitable solvents include n-butyl acetate, methoxypropyl acetate, toluene, xylene or higher aromatic solvent mixtures such as those sold by Exxon under the trade name Solvesso.

In a preferred embodiment the process according to the invention is carried out by introducing the liquid or dissolved isocyanate component into a vessel along with first portion of the blocking agent, for example component A). The reaction with diisopropylamine proceeds rapidly even at relatively low temperatures of, for example, 40° C. The calculated NCO content is exactly reached. Then, the other portion of blocking agent, for example component B), is added. If malonic acid esters are used, the total quantity of malonic ester is mixed with approx. 1.5% of a strong base, for example sodium methylate. This mixture is stirred into the partially blocked polyisocyanate such that a slightly exothermic reaction is observed. The reaction is continued at 70° C. for approx. 1 to 2 hours until an NCO content is no longer detectable by IR spectrometry. The mixture is then adjusted to the desired viscosity with the previously disclosed solvents.

The predominantly or completely blocked polyisocyanates according to the invention are those with the previously disclosed characteristics. In general, these blocked polyisocyanates are used as 50 to 80 wt.%, preferably 60 to 75 wt.%, solutions in lacquer solvents. In the preferred embodiment for preparing the compounds according to the invention, the quantity of solvent is preferably selected in such a manner that such solutions are directly obtained.

In accordance with the invention, it is possible for the first time to convert practically any desired polyisocyanate into the corresponding blocked polyisocyanate, which are storage stable in conventional lacquer solvents and enable the production of baking lacquers having a maximum crosslinking temperature of 140° C. The "crosslinking temperature" means the temperature at which maximum crosslinking is observed after heating for 20 minutes in the presence of equivalent quantities of non-volatile alcoholic polyhydroxyl compounds. The crosslinking temperature of aliphatic polyisocyanates which are blocked according to the invention with equimolar quantities of diisopropylamine and 1,2,4-triazole is 139° C., without the addition of a catalyst. Polyisocyanates according to the invention with aliphatically bound isocyanate groups which are blocked with an equimolar mixture of diisopropylamine and malonic acid diethyl ester have a crosslinking temperature of 130° C.

Compared with IPDI or IPDI derivatives exclusively blocked with malonic acid diethyl ester, the polyisocyanates according to the invention are not exclusively blocked with malonic acid diethyl ester so that when the compounds according to the invention are used as crosslinking agents for polyhydroxyl compounds at least some urethane groups are produced. Therefore, the technical properties of the resulting coatings are improved when compared to coatings containing only amide groups which are obtained from the use of prior art polyisocyanates exclusively blocked with CH-acid compounds. The proportion of amide groups, which impairs properties, is thus reduced to a tolerable level by using the compounds according to the invention. In addition, the storage stability of the coating compositions containing a polyisocyanate component which is partially blocked with CH-acidic esters and partially blocked with diisopropylamine, is distinctly improved (see comparative examples 10 and 11).

Further, the yellowing of coatings prepared from compositions containing the blocked polyisocyanates according to the invention is less than when polyisocyanates blocked with, for example, butanone oxime, are used.

The predominantly or completely blocked polyisocyanates according to the invention constitute valuable crosslinking resins for organic polyhydroxyl compounds in the production of baking lacquers. They may be used in place of the blocked polyisocyanates previously used for this purpose. Suitable polyhydroxyl compounds for this purpose, together with further details relating to the production and use of such baking lacquers may be found in the relevant literature, for example Z. W. Wicks, Progr. Org. Coat. 9, 20 (applications) 1981.

In the following examples, all parts and percentages are by weight unless otherwise indicated.

EXAMPLES

Starting materials

Polyisocyanate I:

An isocyanurate group-containing polyisocyanate prepared by the catalytic trimerization of 1,6-diisocyanatohexane and having an NCO content of 21.5%, a monomeric 1,6-diisocyanatohexane content of 0.2% and a viscosity (23° C.) of 3000 mPa.s.

Polyisocyanate II:

4,4'-diisocyanatodicyclohexylmethane.

Polyisocyanate III:

A polyisocyanate mixture of the diphenylmethane series having an NCO content of 31.4% and containing 80% of 4,4'-diisocyanatodiphenylmethane, 9% of 2,4'-diisocyanato-diphenylmethane, 1% of 2,2'-diisocyanatodiphenylmethane and 10% of higher functional homologs of these diisocyanates.

Polyisocyanate IV:

A 70% solution in Solvesso 100 solvent of an isocyanurate group containing polyisocyanate prepared from IPDI and having an NCO content of the solution of 11.6%.

Polyisocyanate V:

An isocyanurate group-containing polyisocyanate prepared from 1,6-diisocyanatohexane and having an NCO-content of 21.0%, a monomeric 1,6-diisocyanatohexane content of 0.1% and a viscosity (23° C.) of 3300 mPa.s.

Dihydroxy compound I:

An adduct prepared by adding 2 moles of propylene carbonate onto 1 mole of hydrazine and having the formula

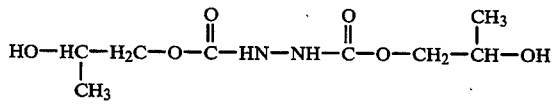

EXAMPLE 1 (comparative example)

| Formulation: | |
|---|---|
| 195 g (1.0 equiv) | polyisocyanate I |
| 176 g (1.1 moles) | malonic acid diethyl ester |
| 2.7 g | sodium methylate solution (30%) in methanol |
| 160.1 g (70%) | methoxypropyl acetate |
| 533.8 g (1.0 equiv) | blocked NCO groups |

Performance:

Polyisocyanate I was introduced into a vessel and stirred at room temperature. The distilled malonic ester and sodium methylate solution were stirred together in a glass beaker. This slightly turbid mixture was poured into the stirred polyisocyanate. An exothermic reaction was observed. The reacting mixture was heated to approx. 60° C. Using an oil bath, the temperature was raised to 70° C. and the reaction was continued at this temperature for approx. 4 hours until the NCO band had disappeared from the IR spectrum. The reaction product was diluted with the solvent and an almost colorless, clear solution was obtained which had a viscosity of approx. 1000 mPa.s at 23° C.

After storage for approx. I week at room temperature, the viscosity of this solution increased dramatically. The solution became gel-like and finally solidified into a glassy, transparent gel after storage for 14 days storage. The product could be reliquefied by melting (approx. 60° C.).

EXAMPLE 2 (comparative example)

| Formulation: | |
|---|---|
| 195 g (1 equiv) | polyisocyanate 1 |
| 106 g (1.05 moles) | diisopropylamine |
| 129 g (70%) | methoxypropyl acetate |
| 430 g (1.0 equiv) | blocked NCO groups |

Performance:

Polyisocyanate I and solvent were introduced into a vessel. Diisopropylamine was added dropwise at room temperature while the mixture was being stirred. The mixture was heated to 70° C. for approx. 10 minutes to complete the reaction. No NCO content was detectable by IR spectrometry. A colorless, clear solution having a viscosity at 23° C. of approx. 6000 mPa.s was obtained. Over a period of several days, the solution started to flow in a gel-like manner down the sides of the vessel. After two weeks, the product began to crystallize out into whitish crystals.

EXAMPLE 3 (according to the invention)

| Formulation: | |
|---|---|
| 390 g (2.0 equiv) | polyisocyanate I |
| 160 g (1.0 mole) | malonic acid diethyl ester |
| 2.4 g | sodium methylate solution (30%) |
| 111.1 g (1.1 moles) | diisopropylamine |
| 284.4 g | methoxypropyl acetate |

| Formulation: | |
|---|---|
| -continued | |
| 947.9 g (2.0 equiv) | blocked NCO groups |

Performance:

Polyisocyanate I was introduced into a vessel at room temperature and stirred. The mixture of malonic ester and sodium methylate solution was then added. On completion of addition, the temperature had risen to approx. 50° C. The mixture was heated to 70° C. and stirred for a further 20 minutes. The measured NCO content was just below the calculated content of 7.6%. The mixture was diluted with methoxypropyl acetate and cooled to approx. 40° C., and diisopropylamine was added dropwise. 10 minutes after completion of the addition, no NCO content was detectable by IR spectrometry. A clear, almost colorless solution was obtained having a viscosity at 23° C. of 2500 mPa.s and an NCO content in blocked form of 8.7%. The solution had a storage life of at least 6 months without crystallization.

EXAMPLE 4 (according to the invention)

| Formulation: | |
|---|---|
| 195.0 g (1.0 equiv) | polyisocyanate I |
| 131.0 g (1.0 equiv) | polyisocyanate II |
| 75.8 g (0.75 moles) | diisopropylamine |
| 104.0 (0.8 moles) | acetoacetic ester |
| 2.0 g | sodium methylate solution (30%) |
| 59.0 g (0.50 equiv) | dihydroxy compound I |
| 243.0 g (70%) | butyl acetate |
| 809.8 g (1.5 equiv) | blocked NCO groups |

Performance:

Both polyisocyanates were introduced into a vessel in butyl acetate. To the stirred solution was added dropwise the stated quantity of diisopropylamine, wherein a slight exothermic reaction was observed. Then, the highly viscous, colorless dihydroxy compound I was added and the reaction mixture was heated to 100° C. After a reaction time of approx. 4 hours, the calculated NCO content of 4.5% was achieved. The mixture was cooled to 70° C. and the solution of acetoacetic acid ethyl ester with sodium methylate was added in portions. After a reaction time of approx. 12 hours no NCO content was detectable by IR spectrometry. A clear, light yellow solution was obtained having a viscosity at 23° C. of approx. 3000 mPa.s and an NCO content in blocked form of 7.7%. The solution had a storage life of at least 6 months.

EXAMPLE 5 (according to the invention)

| Formulation: | |
|---|---|
| 804.0 g (6.0 equiv) | polyisocyanate III |
| 336.0 g (3.0 equiv) | of a polypropylene glycol with an OH number of 500 |
| 240.0 g (1.5 moles) | malonic acid diethyl ester |
| 2.4 g | sodium methylate solution (30%) |
| 151.0 g (1.5 moles) | diisopropylamine |
| 654.0 g (approx. 30%) | methoxypropyl acetate |
| 2187.4 g (3.0 equiv) | blocked NCO groups |

Performance:

Polyisocyanate III, solvent and polypropylene glycol (OH number 500) were introduced into a vessel and heated to 100° C. while being stirred. After a reaction time of approx. 30 minutes, the calculated NCO content of 7.0% was reached. The mixture was cooled to 70° C. and the solution of malonic ester and sodium methylate was added in portions. The mixture was stirred for approx. 1 hour at 70° C. and the NCO content was found to be slightly less than the calculated value of 3.09%. Diisopropylamine was then added dropwise over 50 minutes without further heating. A sample shows no NCO content was detectable by IR spectrometry. A reddish-brown, clear solution was obtained having a viscosity at 23° C. of 6000 mPa.s. The blocked polyisocyanate solution had a storage life of at least 6 months without crystallization. The blocked NCO group content was 5.7%.

EXAMPLE 6 (according to the invention)

| Formulation: | |
|---|---|
| 724 g (2.0 equiv) | polyisocyanate IV |
| 69 g (1.0 mole) | 1,2,4-triazole |
| 106 g (1.05 moles) | diisopropylamine |
| 343 g (55%) | methoxypropyl acetate |
| 1242 g (2.0 equiv) | blocked NCO groups |

Performance:

Polyisocyanate IV was introduced into a vessel and mixed with the crystalline 1,2,4-triazole. The mixture was heated to 110° C. while being stirred and reacted for approx. 3 hours until the calculated NCO content of 5.29% was reached. The mixture was then diluted with methoxypropyl acetate and cooled. At approx. 50° C., the diisopropylamine was added dropwise to the solution. A slight exothermic reaction was observed. On completion of diisopropylamine addition, no NCO content was detectable by IR spectrometry. The 55% solution of this blocked polyisocyanate had a viscosity at 23° C. of 2300 mPa.s and an NCO content in blocked form of 6.76%. The solution had a storage life of at least 6 months without crystallization.

EXAMPLE 7 (according to the invention)

| Formulation: | |
|---|---|
| 280.0 g (1.4 equiv) | polyisocyanate V |
| 362.0 g (1.0 equiv) | polyisocyanate IV |
| 69.0 g (1.0 mole) | 1,2,4-triazole |
| 101.0 g (1.0 mole) | diisopropylamine |
| 47.2 g (0.4 equiv) | diol I |
| 302.0 g (65%) | methoxypropyl acetate |
| 1161.2 g (2.0 equiv) | blocked NCO groups |

Performance:

Both polyisocyanate components, the methoxypropyl acetate and the crystalline 1,2,4-triazole (flakes) were introduced into a vessel and heated to 100° C. while being stirred. After approx. 30 minutes, the NCO content of the reaction mixture had fallen to the calculated value of 4.1%. The mixture was cooled to 60° C., diisopropylamine was added dropwise and diol I added. The mixture was then reacted for approx. 2 hours at 100° C. until no further NCO groups were detectable by IR spectroscopy.

A clear, light yellow solution of a co-blocked polyisocyanate was obtained. The solution had a storage life of at least 6 months without crystallization. The viscosity at 23° C. was approx. 7800 mPa.s.

EXAMPLE 8 (according to the invention)

Formulation:

| | | |
|---|---|---|
| 362.0 g (1.0 equiv) | polyisocyanate IV | |
| 280.0 g (1.4 equiv) | polyisocyanate V | |
| 156.0 g (1.2 moles) | acetoacetic ester | |
| 1.2 g | sodium methylate solution (30%) | |
| 121.2 g (1.2 moles) | diisopropylamine | |
| 155.0 g | methoxypropyl acetate | |
| 1055.4 (1.4 equiv) | blocked NCO groups | |

Performance:

The isocyanate mixture was blocked in a manner analogous to that described in Example 4. A clear, light yellow solution (75%) was obtained having a viscosity at 23° C. of approx. 14,500 mPa.s and an NCO group content in blocked form of 9.3%. The solution had a storage life of at least 6 months without crystallization.

EXAMPLE 9 - Ready-to-spray, pigmented baking filler (according to the invention)

71.3 parts by weight of a polyester solution (I) present at 65% solids in a mixture of Solvesso 100 solvent-/isobutanol (weight ratio 31.5:3.5), having a hydroxyl content, based on solution, of 1.7%, an acid value of 5 and a viscosity of 2700 mPa.s at 23° C. (Alkynol 1665, manufacturer: Bayer, Leverkusen) were combined with 216.4 parts by weight of barium sulphate (Blanc fixe micro, manufacturer: SachtlebenChemie, Duisberg), 54.1 parts by weight of titanium dioxide (Bayertitan R-KB-2, manufacturer: Bayer, Leverkusen), 18.0 parts by weight of a pigment (light blue 2 R, manufacturer: Bayer, Leverkusen), 3.6 parts by weight of a dispersing auxiliary (Antiterra U, present as a 50% solution, manufacturer: Byk-Chemie, Wesel), 3.6 parts by weight of silica gel (Aerosil R 972, manufacturer: Degussa, Frankfurt am Main), 16.0 parts by weight of 1-methoxypropyl acetate-2, 15.9 parts by weight of butyl acetate and 15.9 parts by weight of xylene. The mixture was dispersed for 45 minutes in a bead mill (model: VSME, manufacturer: Vollrath, Cologne) such that the temperature of the material being dispersed did not exceed 50° C.

The resulting paste was combined by stirring with a further 171.7 parts by weight of polyester solution I, 80.5 parts by weight of a polyester solution (II) present at 80% solids in butyl acetate and having a hydroxyl content of 3.4%, an acid value of ≦2 and a viscosity of 2500 to 3500 mPa.s at 23° C. (Desmophen 670, 80%, manufacturer: Bayer, Leverkusen), 3.6 parts by weight of a flow control auxiliary (Byk 358, present as a 50% solution, manufacturer: Byk Chemie, Wesel), 81.4 parts by weight of an amino resin (Maprenal MF 890, 62% in n-butanol, manufacturer: Cassella, Frankfurt am Main), 117.1 parts by weight of the polyisocyanate solution of Example 8, 43.6 parts by weight of 1methoxypropyl acetate-2, 43.6 parts by weight of butyl acetate and 43.7 parts by weight of xylene.

The resulting coating composition was readily sprayable and displayed good flow-out on heat-resistant polyester film, glass, sheet iron and electrocoated sheet metal.

Solids content according to weighed portion: 65.6%.
Viscosity as draining time: 30 seconds in 4 mm DIN cup (DIN 53 211 ).

The coating composition was sufficiently reactive at a baking temperature of 130° C. to cure without catalysis. Properties of the coating after baking for 30 minutes in a circulating air drying cabinet at 130° C:
König pendulum hardness: 142 sec (DIN 53 157)
Erichsen indentation to DIN 53 156:10.5 mm Dry film thicknesses of up to 45 μm were achieved in a single operation without blistering or surface defects on electrocuted metal sheets (cathodically electrocuted metal sheet, lacquer test sheets from Mercedes Benz AG, Sindelfingen).

Within the coating structure, the filler exhibited good adhesion to the substrate (electrocoating) and good intercoat adhesion to basecoat and topcoat lacquers.
Stone impact testing:

A cathodically dipcoated metal sheet was coated with the filler produced according to the invention (dry film thickness 35 μm, baked for 30 minutes at 130° C.), overcoated with a commercial alkyd/amino based topcoat (Tornado red, PPG, Wuppertal) and baked for 25 minutes at 155° C. (dry film thickness 45 μm). The coating displayed high resistance to stone impact when subjected to the VDA (Verband der Automobilindustrie =automotive industry association) stone impact test (model 508, 2 times 500 g steel pellets, 1.5 bar), having a rating of 1 or 2 according to the prescribed VDA assessment method.
Storage stability:

After 3 months storage at room temperature, the viscosity of the coating composition was unchanged.

After storage for 30 days in a drying cabinet at 50° C., the viscosity to DIN 53 211 (see above) had risen to a draining time of 42 seconds from a 4 mm DIN cup. The König pendulum hardness (see above) after baking in an circulating air drying cabinet (30 minutes at 130° C.) was 117 sec.

EXAMPLE 10 (comparative example)

Formulation:

| | |
|---|---|
| 362.0 g (1.0 equiv) | polyisocyanate IV |
| 280.0 g (1.4 equiv) | polyisocyanate V |
| 156.0 g (1.2 moles) | acetoacetic ester |
| 192.0 g (1.2 moles) | malonic acid diethyl ester |
| 3.2 g | sodium methylate solution (30%) |
| 180.0 g | methoxypropyl acetate |
| 1173.2 g (2.4 equiv) | blocked NCO groups |

Performance:

The polyisocyanates were combined while being stirred at room temperature with the mixture of the two CH-acidic esters and sodium methylate. Addition was made in portions, so that the exothermic reaction was controlled. On completion of the addition, the temperature of the reaction mixture had risen to approx. 60° C. The reaction was continued for a further 5 hours at 70° C., until the NCO band in the IR spectrum was scarcely detectable. The mixture was then diluted with methoxypropyl acetate. A clear, light yellow solution (approx. 75%) was obtained having a viscosity at 23° C. of approx. 10,000 mPa.s and an NCO group content in blocked form of 8.5%.

EXAMPLE 11 —Comparison Example

Comparison of increase in viscosity in clear lacquers
a) According to the invention 503.6 parts by weight of polyester solution I from Example 9 were combined with 226.4 pads by weight of the polyisocyanate solution from Example 8, 1.8 parts by weight of a flow control auxiliary (Byk 358), 178.8 pads by weight of 1-methoxypropyl acetate-2 and 89.4 parts by weight of xylene and homogenized by stirring.

(Blocked) NCO/OH ratio=1.0.

Solids content according to weighed portion: approx. 49.8%

Viscosity as draining time: 30 sec (DIN 53 211 ).

b) Comparison

EXAMPLE 11 a) was repeated with the sole exception that the polyisocyanate solution of Example 8 was substituted by the equivalent quantity of the polyisocyanate solution according to Example 10.

(Blocked) NCO/OH ratio=1.0.

Solids content according to weighed portion: approx. 55.7%

Viscosity as draining time: 30 sec (DIN 53 211 ).

Storage at 50° C:

After storage for 14 days in a circulating air drying cabinet at 50° C., the viscosity (measured as draining time, see above) of coating composition 11 a) was 36 sec; after 30 days the draining time had not increased further. However, Coating composition 11 b) had a draining time of 60 sec after only 14 days.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An organic polyisocyanate which has a content of unblocked and blocked isocyanate groups (calculated as NCO) of 5 to 20 wt.%, wherein at least 95% of the isocyanate groups are present in blocked form and wherein the blocking agent consists essentially of
   A) 30 to 70 equivalent-% of diisopropylamine,
   B) 30 to 70 equivalent-% of at least one other blocking agent selected from CH-acidic esters and 1,2,4-triazole and
   C) 0 to 20 equivalent-% of blocking agents other than those set forth in A) and B),
   wherein the percentages of A), B) and C) add up to 100.

2. The organic polyisocyanate of claim 1 wherein 100% of the isocyanate groups are present in blocked form.

3. The organic polyisocyanate of claim 1 wherein the blocking agent consists essentially of
   A) 30 to 70 equivalent-% of diisopropylamine and
   B) 30 to 70 equivalent-% of malonic acid diethyl ester.

4. The organic polyisocyanate of claim 2 wherein the blocking agent comprises
   A) 30 to 70 equivalent-% of diisopropylamine and
   B) 30 to 70 equivalent-% of malonic acid diethyl ester.

5. The organic polyisocyanate of claim I wherein said organic polyisocyanate is based on 1,6-diisocyanatohexane.

6. The organic polyisocyanate of claim 2 wherein said organic polyisocyanate is based on 1,6-diisocyanatohexane.

7. The organic polyisocyanate of claim 3 wherein said organic polyisocyanate is based on 1,6-diisocyanatohexane.

8. The organic polyisocyanate of claim 4 wherein said organic polyisocyanate is based on 1,6-diisocyanatohexane.

9. The organic polyisocyanate of claim 1 wherein said organic polyisocyanate is present in the form of a 50 to 80 wt.% solution in one or more organic solvents.

10. A process for the production of an organic polyisocyanate which comprises reacting at 20 to 120° C. at least 95 equivalent-% of the isocyanate groups of an organic polyisocyanate with a blocking agent mixture containing, based on the total equivalents of blocking agents,
    A) 30 to 70 equivalent-% of diisopropylamine,
    B) 30 to 70 equivalent-% of at least one other blocking agent selected from CH-acidic esters and 1,2,4-triazole and
    C) 0 to 20 equivalent-% of blocking agents other than those set forth in A) and B).

11. A coating composition containing the organic polyisocyanate of claim 1 and an organic polyhydroxyl compound.

* * * * *